Aug. 14, 1945.                W. T. HOWARD                2,382,011
                        EQUIPMENT FOR VEHICLE BODIES
                              Filed May 6, 1943
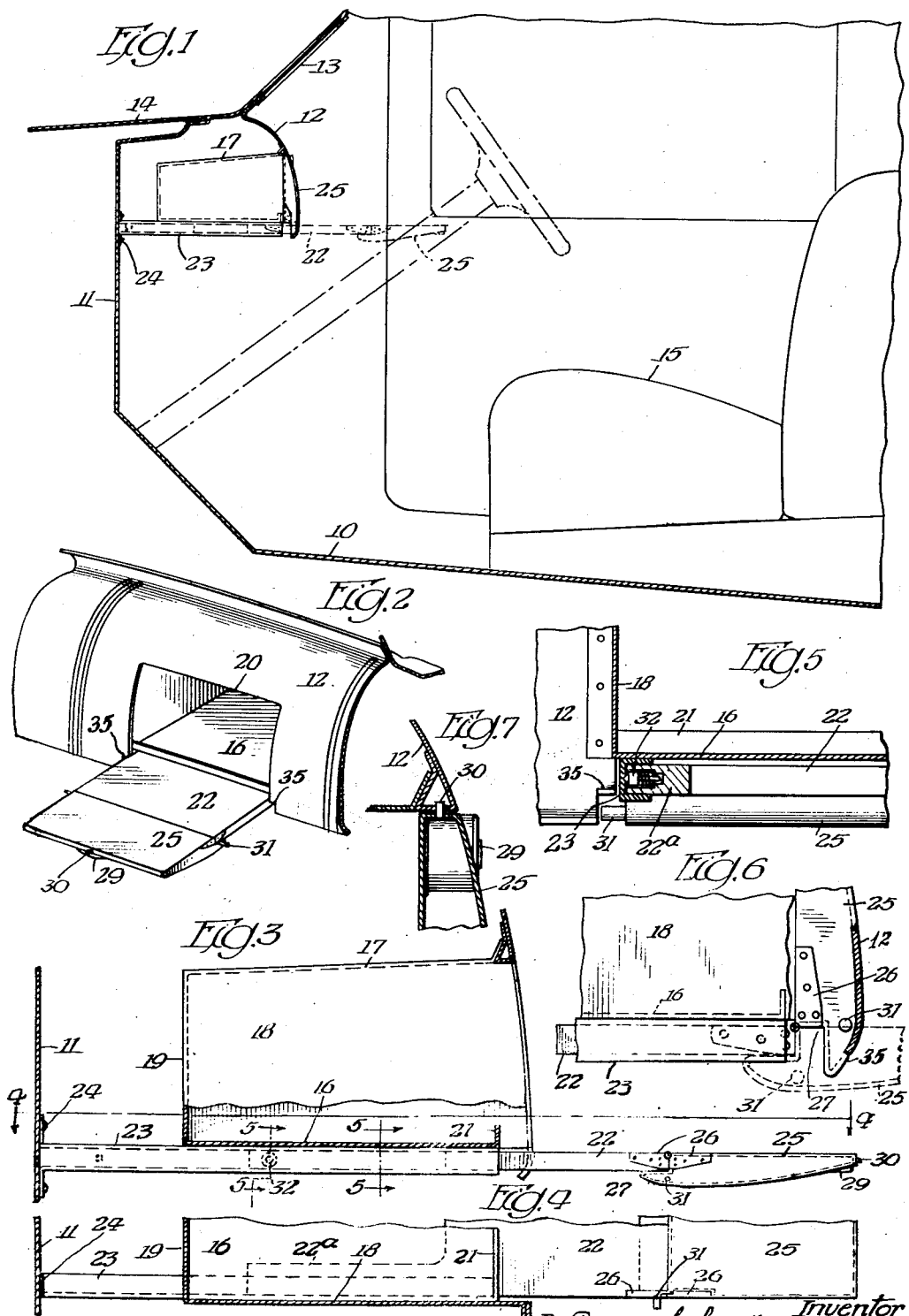

Patented Aug. 14, 1945

2,382,011

UNITED STATES PATENT OFFICE 2,382,011

EQUIPMENT FOR VEHICLE BODIES

William Taylor Howard, Chicago, Ill.

Application May 6, 1943, Serial No. 485,857

3 Claims. (Cl. 312—186)

The invention relates to equipment for vehicle-bodies.

In the use of automobiles, motor trucks and other vehicles, it is frequently or occasionally desirable and advantageous to provide a convenient shelf-like support for articles such as sheets, slips or books of slips while matter is written thereon or which can be used as a convenient, temporary support for other articles within easy reach of a passenger or driver of the vehicle, either while the vehicle is in motion or stationary. It is desirable that such a support be located where it will not interfere with other equipment on the vehicle or reduce the available space for occupancy of passengers. It is advantageous to associate such a support with the usual instrument-panel where it is within convenient reach of the driver or a passenger seated behind the panel and to locate it in an out-of-the-way and concealed position behind the panel when it is not in use.

One object of the invention is to provide a support embodying these advantages and which is associated with the locker or storage-box which is usually provided with the instrument-panel and to utilize the drop-door of the box or locker as an extension or a part of such a support.

Another object of the invention is to provide a support which is adapted to slide into a concealed position under the storage-box and hingedly supports the drop-door for the box so the latter can be used to provide a support of the necessary area for many uses.

Another object of the invention is to combine with a slidable support of this character to which the locker door is pivoted means which will automatically lock the shelf in its concealed position when the door is closed.

Other objects of the invention will appear from the detailed description.

The invention consists in the several novel features which are hereinafter set forth and more particularly defined by claims at the conclusion hereof.

In the drawing:

Fig. 1 is a longitudinal section through a portion of a vehicle body embodying the equipment of the invention.

Fig. 2 is a perspective of a portion of the instrument-panel, the locker, the supporting shelf and the locker door in position for use as a shelf extension.

Fig. 3 is a side view of the storage-box or locker with the shelf and the door in position for supporting purposes, parts being broken away and shown in section.

Figure 4 is a horizontal section taken on line 4—4 of Figure 3.

Fig. 5 is a section taken on line 5—5 of Fig. 3.

Fig. 6 is a view illustrating the locker and the supporting shelf in the position assumed when the door is closed.

Fig. 7 is a detail illustrating the lock for the upper end of the door.

The invention is exemplified as equipment for a vehicle body, the front portion of which comprises a floor 10, a fixed front body panel or dash 11, an instrument panel 12 which usually extends transversely across the front of the body of the vehicle, a windshield 13, an engine hood 14, and a seat 15, all of which may be of usual construction. A storage-box or compartment with a bottom wall 16, top wall 17, side walls 18, and a back wall 19 is fixedly supported in any suitable manner behind the panel 12. The panel 12 has an opening 20. The bottom wall 16 of the box is provided with a flange 21 for retaining articles thereon.

A shelf 22 is slidably mounted under the locker in a pair of inwardly facing channel bars 23, the rear ends of which are fixedly secured at 24 to the front body panel 11. The front portions of the channel bars 23 underlie and are secured, for example by welding, to the bottom wall 16 of the locker. A drop-door 25 is connected by countersunk hinges 26 to the front end of the shelf 22 and is adapted to fit into the opening 20 in the panel 12 and form a closure for the open side of the storage compartment. The shelf 22, when not in use for supporting articles, underlies the bottom of the box and is located behind the panel 12.

The door 25 and the shelf 22 are of substantially the same width. The door 25, through hinges 26, is pivotally supported by the front end of the shelf 22. The hinges 26, when the shelf 22 is retracted under the storage-box, are located so that the door, when swung into substantially vertical position, will close the opening 20. The hinges 26 permit the door 25, when it is dropped or swung downwardly from its box-closing position, to swing into substantially horizontal position with the normally inner face of the door coplanar with the top face of the shelf 22. The door, being hingedly supported by the shelf 22, is adapted, by bodily movement, to retract and withdraw the shelf. The lower corner of the door and the front edge of the shelf have an angular shouldered engagement at 27 so that the door, when dropped, will be supported in horizontal alignment with the shelf with the inner face of the door 25 coplanar with the upper face of the shelf 22, and will serve as, or form, a supporting extension of the shelf with an aggregate supporting area of the door and portion of the shelf withdrawn outwardly of the panel 12. This area will be sufficient to provide a convenient shelf for writing or for supporting other articles either while the vehicle is traveling or stationary. It will be observed that the drop-door 25 and the shelf 22 are movable toward the seat 15 so that the support will be located within convenient reach of a person occupying the seat.

It is desirable to lock the door to prevent access to the contents of the storage-box by a key operable lock 29 in the upper margin of the door with a bolt 30 adapted to enter a slot in a fixed wall of the box. Such a lock alone is not effective to lock the door when its lower end is hinged to the slidable shelf 22. In order to render such a lock effective, the ends of the door are provided with projecting studs 31 which, when the door is closed and the shelf 22 is in its retracted position, will engage and be arrested by the margins of the panel 12 at the sides of the opening 20. When the door is closed, the studs 31 will prevent the shelf 22 and lower end of the door from being pulled toward the seat 15, while the locking bolt 30 is in its operative position, and thus prevent the door from being opened. The shelf will then be locked against withdrawal. When the bolt 30 is unlocked, the door 25 is free to swing downwardly on its hinges 26. When the door is dropped, the studs 31 will swing below the lower edge of the panel 12 and permit the door 25 and shelf 22 to be moved together into position for use as a support. Spring loaded snaps 32 may be provided in the channel bars 23 and the side edges of the shelf 22 to frictionally hold the shelf retracted when the door is used only for access to the storage-box and to hold the shelf and the door in their withdrawn position for use. Notches 35 are formed in the front wall to permit the pins 31 to pass under said wall when the door is partially lifted.

When the shelf 22 is retracted, it is concealed under the panel 12 and the storage-box. The shelf does not interfere with the utilization of the space rearwardly of the front body panel for equipment such as mechanism for operating windshield wipers, radio connections, and other devices. When it is desired to use the support, it is only necessary to unlock and drop the door 25 and pull it outwardly to withdraw the usable portion of the shelf 22 into the position illustrated in Fig. 3, where it will be positioned within convenient reach of a person in the front of the vehicle or on the seat 15. After use, it is only necessary to push the door 25 toward the panel 12 and then swing it upwardly in its closed position where it may be locked to prevent access to the storage-box. The studs 31 serve to lock the lower portion of the door against bodily movement away from the panel 12, and the withdrawal of the shelf, when the locking-bolt 30 secures the upper end of the door in the panel 12.

For lightness and stiffness, the shelf 22 may be formed of wood with rearward extensions 22ª which are of sufficient length to firmly support said shelf when it is withdrawn to the front of the panel 12.

The invention exemplifies, a conveniently usable disappearing support in which the door of the storage compartment or box is utilized with a slidable shelf as an extensible section, which is adapted to be installed without substantial change in construction in the vehicle body, and which is usable for many purposes. This equipment may be installed in a vehicle body at a low cost.

The invention is not to be understood as restricted to the details set forth, since these may be modified within the scope of the appended claims without departing from the spirit and scope of the invention.

Having thus described the invention, what I claim as new and desire to secure by Letters Patent is:

1. A storage compartment structure comprising a wall having an opening therein and a storage box behind said wall and accessible through said opening comprising, a supporting shelf, tracks under the box in which the shelf is slidably mounted to move through the panel, a drop-door fitting in and forming a closure for said opening, hingedly supported on and movable bodily with the shelf and adapted, when dropped to its open position, to form a supporting extension substantially continuous with the shelf, and means between the door and the wall for holding the shelf against withdrawal when the door is closed, said means being releasable by the swinging movement of the door to its open position.

2. A storage compartment structure comprising a wall having a front opening therein and a storage box behind said wall and accessible through said opening comprising, a supporting shelf, tracks under the box in which the shelf is slidably mounted to move through the panel, a drop-door fitting in and forming a closure for said opening, hingedly supported on and movable bodily with the shelf and adapted, when dropped to its open position, to form a supporting extension substantially continuous with the shelf, and studs projecting from the ends of the door engageable with the wall around the opening when the door is closed for holding the shelf against sliding movement, said studs being movable to clear the panel by the swinging of the door to its open position.

3. A storage compartment structure comprising, a front wall; a box forming a compartment rearwardly of the front wall, provided with a bottom, sides and back, and having an open front end secured to the front wall; the front wall having an opening therein at the front of the box for access to the compartment; a wall rearwardly of and spaced from the back of the box; tracks depending from, and secured to the bottom of, the box and extending rearwardly of the back of the box, and secured to said rear wall; a shelf slidably supported by the tracks and provided with extensions projecting rearwardly and slidable in said tracks rearwardly of the box; and a drop-door forming a closure for the opening in the front wall, hinged to, supported on, and movable with said shelf and adapted when dropped into its open position to form a supporting extension which is substantially co-planar with the shelf.

WILLIAM TAYLOR HOWARD.